INVENTOR.
JOSEPH E. BISHOP
BY [signature]
ATTORNEY

April 21, 1970 J. E. BISHOP 3,508,228

DIGITAL CODING SCHEME PROVIDING INDICIUM AT CELL BOUNDARIES UNDER PRESCRIBED CIRCUMSTANCES TO FACILITATE SELF-CLOCKING

Filed March 28, 1967 4 Sheets-Sheet 2

United States Patent Office 3,508,228

Patented Apr. 21, 1970

3,508,228

DIGITAL CODING SCHEME PROVIDING INDICIUM AT CELL BOUNDARIES UNDER PRESCRIBED CIRCUMSTANCES TO FACILITATE SELF-CLOCKING

Joseph E. Bishop, Scottsdale, Ariz., assignor to General Electric Company, a corporation of New York Filed Mar. 28, 1967, Ser. No. 626,553
Int. Cl. G11b 5/00, 5/06
U.S. Cl. 340—174.1 3 Claims

ABSTRACT OF THE DISCLOSURE

Described herein is a system for recording digital information onto and for reading digital information from a storage medium by the placing of an indicia on a storage medium at particular points within designated areas on the storage medium. By its relative positioning within the specific area, the indicia is representative of specified increments of information.

BACKGROUND OF THE INVENTION

The present invention relates generally to the storage and retrieval of information and more particularly to the storage of and retrieval of information in binary form.

The present information is particularly applicable, although it is not so limited, to the storage of information in digital form onto a magnetic storage medium such as those which find common usage in electronic data processing systems.

In any storage and retrieval system, the primary objective is, of course, to accurately record and retrieve the desired information. In modern day electronic data processing systems, however, it is becoming increasingly important to increase the rate at which data may be brought from or sent to an external storage device from the processor of the system which actually performs the computations and manipulations of the data. Additionally, because of the ever increasing volume of data which is required, it is becoming increasingly important to increase the amount of data which can be stored on a given area of storage medium. This latter feature is commonly referred to as the "packing density" and is normally expressed in bits per inch, that is, the number of binary bits which can be stored with respect to a given length of storage medium.

It is known in the art that digital information can be stored on a medium having a magnetizable surface and that information thus stored may be recovered by providing relative movement between the medium and a transducer which detects polarity changes of discrete areas of the medium surface. The detected pattern of magnetic polarization, or flux reversals as they are commonly called, taken in conjunction with an additional parameter, for example, time is indicative of the information stored and retrieved and this pattern is commonly referred to as a code.

Inasmuch as any given storage medium has, taken in conjunction with the equipment used to record thereon and read therefrom, a given packing density factor (i.e., flux transitions can only be placed so close to one another before it becomes impossible to distinguish between the transitions) and inasmuch as these same basic conditions are prevalent with respect to the relative speeds which can be permitted between the storage medium and the transducer, the sole remaining manner in which the amount of data which can be recorded in a given length of storage medium is limited by the pattern of flux reversals or, more simply, the code utilized. Stated in another way, the code which provides the least amount of flux reversals for a given amount of information is that which will produce the highest amount of information storage.

OBJECTS

It is, therefore, an object of the present invention to provide an improved data information storage and retrieval system.

Another object is to provide means for increasing the amount of information which can be stored and recovered from a storage medium without decreasing the distance between the flux reversals on the storage medium.

Still another object is to provide a method and means for increasing the amount of digital information which can be placed upon a storage medium by providing that the number of recorded indicia is less than the number of units of information desired to be stored.

SUMMARY OF THE INVENTION

Briefly stated, the present invention provides the foregoing and other objects by providing a method and apparatus for recording binary data in a manner such that the representation of two binary bits is recorded within a unit of storage media or within what will be hereinafter referred to as a cell. This is accomplished in the illustrated embodiment of the present invention by dividing each cell into four equal parts and by recording a flux transition or reversal at one or more of the division points within the cell in accordance with a two binary bit combination to be recorded. The actual combination of binary bits represented by the flux transition(s) indicated by the relative position of the transition(s) within the individual cell. The present invention also provides, when desired and under specified conditions, for the insertion of a flux reversal at a particular point within the cell which is not representative of data but which is utilized for synchronization purposes. This reversal may be required under certain circumstances and its availability alleviates the necessity of extremely precise equipment for the practical utilization of applicant's invention.

BRIEF DESCRIPTION OF THE DRAWING

Further objects and advantages of the invention will become apparent as the following description proceeds and features of novelty which characterize the invention will be pointed out in particularity in the claims annexed to and forming a part of this specification. For a better understanding of the present invention, reference is made to the accompanying drawing in which:

DESCRIPTION OF THE PREFERRED EMBODIMENT

Figure 1:
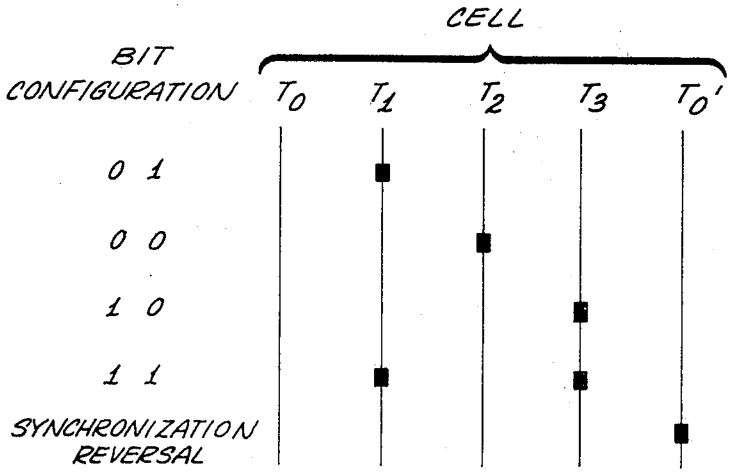
FIG. 1 is a diagram illustrating the manner in which various binary bit configurations are recorded within a cell area of storage medium in accordance with the present invention.

The manner in which information is stored as a pattern or is coded onto a recording medium may best be seen with reference to FIG. 1. In that figure, there is shown the representation of a single data cell which corresponds to a specified area of storage medium onto which the pattern is to be stored. It is seen that the cell is divided into four equal parts by the lines $T_0$, $T_1$, $T_2$, $T_3$ and $T_0'$, collectively referred to as T times. These T times designate the subdivisions of the data cell and it is at these times that, in the case of a magnetic recording, the flux reversals are placed onto the storage medium to represent the various binary bit configurations. In accordance with the provisions of the present code, and as is illustrated in FIG. 1, if a 01 binary bit configuration is to be written, a transition or flux reversal is placed at the $T_1$ time, at the ¼ point of the cell. A 00 bit configuration is written at $T_2$ time (mid-point) while a 10 binary bit combination is written as a flux reversal at $T_3$ (¾ point) time. The fourth possible combination of a two bit binary designation is the 11 configuration and it is seen in FIG. 1 that this is designated by a flux reversal at both the $T_1$ and $T_3$ times. The remaining depiction of FIG. 1 is a reversal at $T_0'$ time designated synchronization reversal. This transition does not actually represent data in the present code but is instead used for synchronization or clocking purposes.

As will become more apparent as this description proceeds, the present code adapts itself well to self-synchronization or self-clocking in reading data from the storage medium. (By self-clocking it is meant that the flux reversals used to designate data are also used to maintain synchronization within the system.) It will be seen that, in certain bit configurations, the distance between successive flux reversals exceeds a maximum which is, essentially, established by the self-clocking capability of the particular system. As such, in the to be described embodiment, provision is made under these particular circumstances for inserting the flux reversal at the boundary of the cell ($T_0$ time) in order to properly maintain synchronism and to preclude the necessity of providing extremely stable and hence extremely expensive clocking means. There are three situations in which the synchronization reversal is supplied. These are:

01 followed by 10
01 followed by 00
00 followed by 10

These three situations represent those binary bit configuration combinations which would result in a time greater than that corresponding one cell time without a flux reversal. It is to be expressly understood, however, that the synchronization reversal does not form a portion of the recorded data. It should also be mentioned at this time, and as will be more fully explained hereinafter, that in the strictest sense of the word the flux reversal which occurs at $T_2$ time and which represents the binary bit configuration 00 is also unnecessary. It is, however, utilized in the present implementation in order that if, for example, a long series of zeros were to be written there would be some flux reversals to maintain synchronism within the system .

Figure 2:
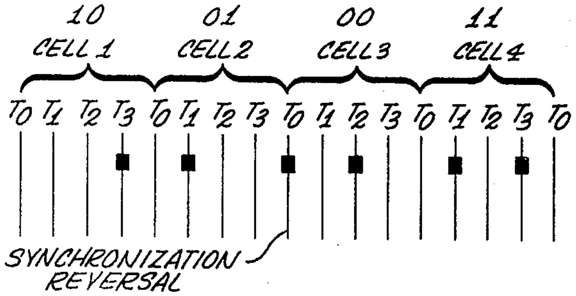
FIG. 2 illustrates the recording of an eight binary bit configuration in four successive storage cells.

Referencing now FIG. 2, there is shown the reversal pattern which would be written onto a magnetic recording surface for the eight binary bit configuration shown which is, reading left to right, 10 01 00 11. These eight binary bits are respectively allocated one to each of four cells 1 through 4. As is shown in FIG. 2 the 10 binary bit configuration is recorded as a reversal at $T_3$ time of cell 1 and the 01 binary bit configuration is recorded as a flux reversal at $T_1$ time of cell 2. The 00 binary bit configuration is written at $T_2$ time of cell 3 while the 11 bit configuration is written as flux reversals at both $T_1$ and $T_3$ time of cell 4.

It will be remembered that previous mention was made of a synchronization reversal. This is illustrated at the boundary ($T_0$ time) between cell 2 and cell 3. It may be seen from FIG. 2 that were this reversal not present there would exist five T times or cell subdivisions between reversals in recording the four bit combination 01 00. Inasmuch as this would, in the normal system, represent too great a time to maintain proper synchronization, the synchronization reversal is inserted at the common cell boundary. It is noted that this combination of 01 00 is one of the three situations set forth above.

Figure 3:
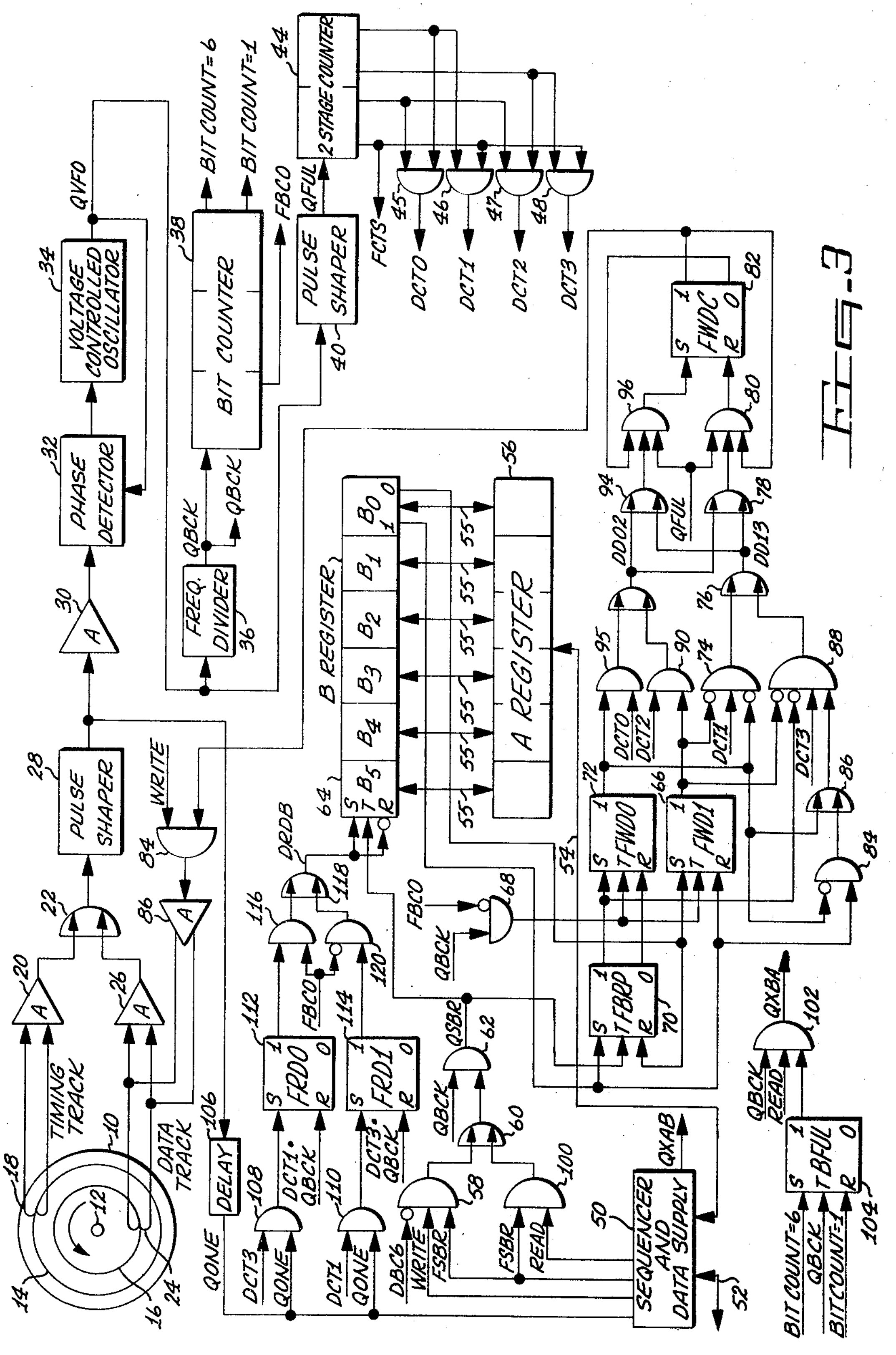
FIG. 3 is a schematic logic diagram illustrating a preferred means for implementing the present invention.
Figure 4:
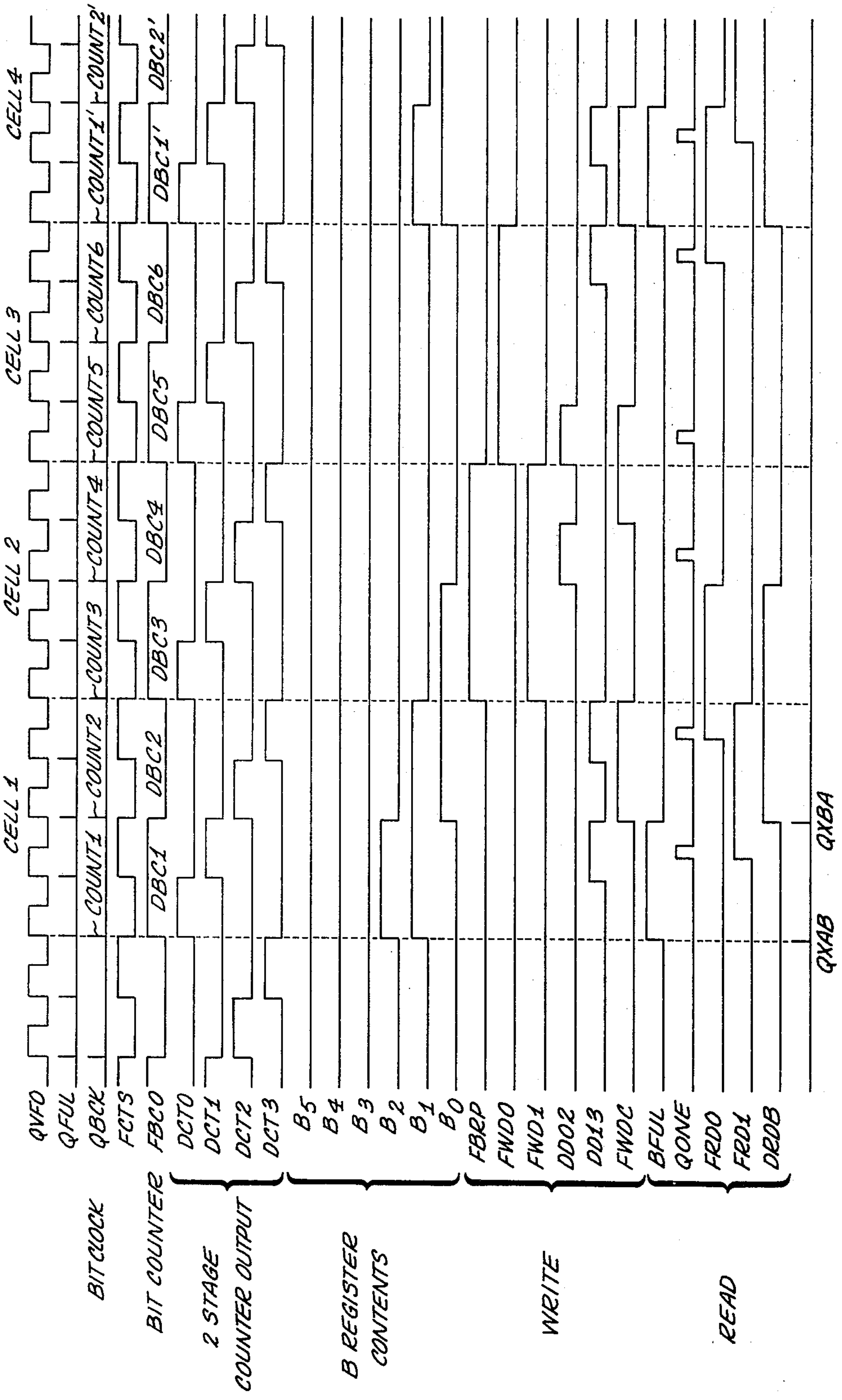
FIG. 4 is a timing diagram useful in the understanding of the representation of FIG. 3.

For a more complete understanding of the invention, reference is made to the logic schematic of FIG. 3 and its accompanying timing diagram, FIG. 4. Before beginning the explanation of these figures, however, it is believed beneficial to briefly explain the terminology to be used. The signals to be described will be referred to as high level or binary 1 signals and low level or binary 0 signals. The logic illustrated is of conventional nature. That is, an AND-gate is a logic element which provides at its output a high level or binary 1 signal when each of its inputs is a binary 1. An OR-gate is a multiple input logic element which provides a binary 1 or high level output when one or more of its inputs is a binary 1. The small circle which is present at the input side of several of the depicted elements of FIG. 3 indicates the inversion feature. By inversion is meant simply that a binary 1 signal applied thereto appears as a binary 0 signal to the element and conversely a binary 0 signal appears as a binary 1 signal to the element. The term flip-flop as is used in the present description designates a bistable multivibrator with its two stable states being a set state in which there is a binary 1 at its 1 output terminal and a reset state in which there is a binary 0 at its 1 output terminal. Two types of flip-flops are utilized in the present description. The first type of flip-flop has two input terminals, an S (set) terminal, and an R (reset) terminal. In this device, a binary 1 applied to the S terminal will place the flip-flop into its set state and a binary 1 placed at its R terminal will place the flip-flop into its reset state. The other type of flip-flop differs from that just described only with respect to the inclusion of a third input terminal designated T. Flip-flops thus designated are trigger flip-flops and their operation differs from that previously described in that the flip-flop will change its state only upon the application of a binary 1 at the T terminal simultaneously with a binary 1 to either of the S or R input terminals.

TIMING

Specifically referencing now FIG. 3 and its associated timing diagram, FIG. 4, there is shown a storage medium 10 which in the illustrated embodiment is in the form of a disc having a magnetizable coating. The disc is mounted for rotation by a suitable means, not shown, in the counterclockwise direction about a central axis 12. On the disc are a timing track 14 and a data track 16 which are operative to store intelligence in the form of discrete magnetically polarized areas. Associated with the timing track 14 is a suitable transducer 18 which serves to generate electrical signals in response to the motion of the disc 10 and the changing polarity of the discrete areas. The signals thus generated are amplified by an amplifier 20 and applied as one input to an OR-gate 22. Similarly, a transducer 24 associated with the data track 16 provides suitable electrical signals which are amplified by means of an amplifier 26, the output of which is also applied to the OR-gate 22. OR-gate 22, although it is illustrated as a simple OR-gate, will in reality perform a somewhat more complex function, namely that of selectively gating either the signals from the timing track or from the data track, or from both tracks to a pulse shaper 28. However, inasmuch as this function does not form a part of the present invention, it is believed sufficient for the present description to illustrate this operation purely as an OR function.

The output of the pulse shaper 28 which, as its name implies, modifies the signals from the OR-gate 22 to a more desirable square wave shape, is amplified by means of an amplifier 30 whose output is applied to a phase detector 32. The output of the phase detector 32, whose function will be described shortly hereinafter, is supplied to a voltage controlled oscillator 34, the output of which is a signal designated QVFO. The QVFO signal is a square wave signal having a frequency, in the present example, of four times the repetition rate of data cell occurrence (see FIG. 4). The output of the voltage controlled oscillator 34 is supplied via a feedback loop to the phase detector 32. The purpose of the phase detector 32 is to compare the frequency of its input from the amplifier 30 with that from the voltage controlled oscillator 34 and to provide a voltage signal, either positive or negative, representative of the difference in phase between these two signals. This voltage to the voltage controlled oscillator 34 causes the oscillator 34 to vary its output frequency such that the output signal QVFO is in synchronism with the basic frequency of the signals being derived from either the timing or data tracks of the disc 10.

The QVFO signal from the oscillator 34 is applied as an input to a frequency divider 36 whose output is a signal designated QBCK which, as may be seen in FIG. 4, is a positive going pulse which occurs at one-half the frequency of the QVFO signal. The QBCK signal from the frequency divider 36 is applied, inter alia, to the first stage of a three stage counter designated bit counter 38. The bit counter 38, which may be of conventional design, furnishes three outputs. The first output from the bit counter 38 is a signal FBCO (FIG. 4) which is a square wave signal having a frequency one-quarter of that of the QVFO signal. Further examination of the FBCO signal as shown in FIG. 4 shows that the FBCO signal is designated at various portions by the designations DBC1 through DBC6. The other two signals which are shown derived from the bit counter 38 and are two signals designated bit count=1 and bit count=6, respectively corresponding to the DBC1 and DBC6 portions of the FBCO signal. By way of explanation of the bit counter 38, it was stated that this is a three stage counter and as such in the binary system would normally possess the capability of providing eight distinct counts. However, in the presently being described example, the size of the data character being utilized is a six bit character and therefore the bit counter, along with other components of the system, is designed to accommodate a six binary bit character. As such, the bit counter 38 counts up through six and then resets to the count of one.

The QVFO signal is also supplied to a pulse shaper 40 the output of which is designated as QFUL which, as may be seen in FIG. 4, is a train of narrow positive going pulses occurring at the frequency of the QVFO signal. The QFUL signal is supplied as an input to a two stage counter 44 which is essentially two flip-flops in a counter configuration designed to step through the binary designations of 0 through 3. The one output of the first stage of the counter 44 is a signal designated FCTS which, as may be seen in FIG. 4, is a square wave signal of one-half the frequency of QFUL. The four output terminals of the two stage counter 44 are applied as inputs to four AND-gates 45 through 48 in a manner such that the outputs of these four AND-gates, DCT0, DCT1, DCT2, and DCT3 (FIG. 4), divide the cell times into four equal parts. The signals thus far described provide the necessary timing for the writing of information onto or reading the information from the storage medium, in the present example the disc 10.

WRITE OPERATION

In the operation of the write cycle of the present invention, information is brought into the system of the present invention to a sequencer and data supply unit 50 via an information bus 52. This information enters the unit 50 prior to the beginning of a write cycle and contains a six binary bit character and a designation that is to be a "write" operation (a write command). This information would normally come from another component within the total of the data processing system, for example, the data processor. In response to the information brought in via bus 52, the unit 50 supplies the six bit data character via a bus 54 to a six bit A-Register 56 which acts as a temporary holding register. Because this is to be a write operation, the unit 50 supplies three additional signals, a write signal which is supplied to a three input AND-gate 58, a signal designated FSBR which indicates that a shift to the B-Register is necessary (also serving as one input to the AND-gate 58), and a signal QXAB. The QXAB signal effects the transferring of the contents of the A-Register 56 to a B-Register 64. The other input to the AND-gate 58 is the inversion of the DBC6 signal. The output of the AND-gate 58 forms one input to an OR-gate 60 which in turn serves as one of two inputs to an AND-gate 62. The other input to the AND-gate 62 is the QBCK signal. The output of AND-gate 62, QSBR, is applied to the T terminal of the first stage ($B_5$) of the B-Register 64.

The B-Register 64 is a six bit register comprised of six flip-flops designated respectively, reading right to left, $B_0$ through $B_5$. B-Register 64 is the main data register of the system and is a register into which data is shifted serially during the read operation and from which data is shifted serially during the write operation.

Continuing now with the description of the writing operation, the six binary data bits in the A-Register 56 are transferred in parallel to the B-Register 64 via lines 55 with the occurrence of that QSBR signal from AND-gate 62 effected by the QBCK pulse designated count 1 in FIG. 4. At the same time, the previous content of the $B_0$ flip-flop of the B-Register is transferred to an FWD1 flip-flop 66. Flip-flop 66 is a trigger flip-flop and its T terminal is connected to the output of an AND-gate 68 whose two inputs are the QBCK and the inversion of FBCO. Thus it is seen that each time FBCO is at the low level and there occurs a QBCK signal, AND-gate 68 is enabled thus enabling flip-flop 66. Also at this same time, the content of another flip-flop 70 (FBRP) is transferred to an FWD0 flip-flop 72. The flip-flops 70 and 72 are each triggered flip-flops with the T terminal of FBRP being connected to the QSBR signal and the T terminal FWD0 connected to the output of the AND-gate 68. At the time of this transfer FBRP 70 contained the last binary bit of the character immediately preceding the one which is presently to be written.

Figure 5:
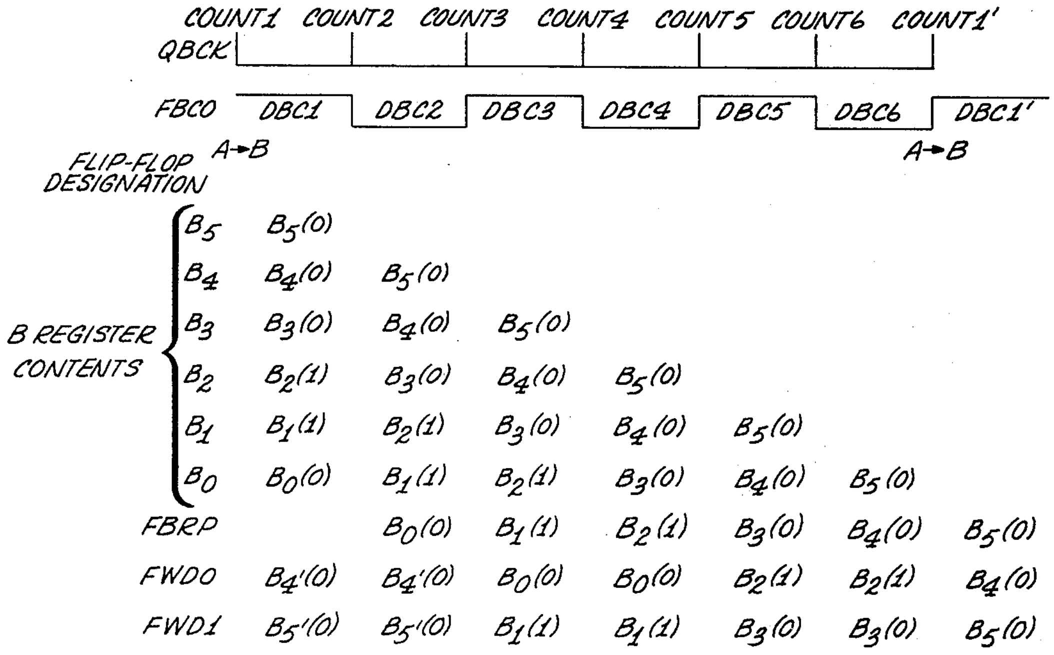
FIG. 5 is a chart illustrating the contents of a register shown in FIG. 3 during the time in which data is being written onto the storage medium; and, FIG. 6 is a chart illustrating the contents of a register shown in FIG. 3 during the time in which data is being read from the storage medium.
Figure 6:
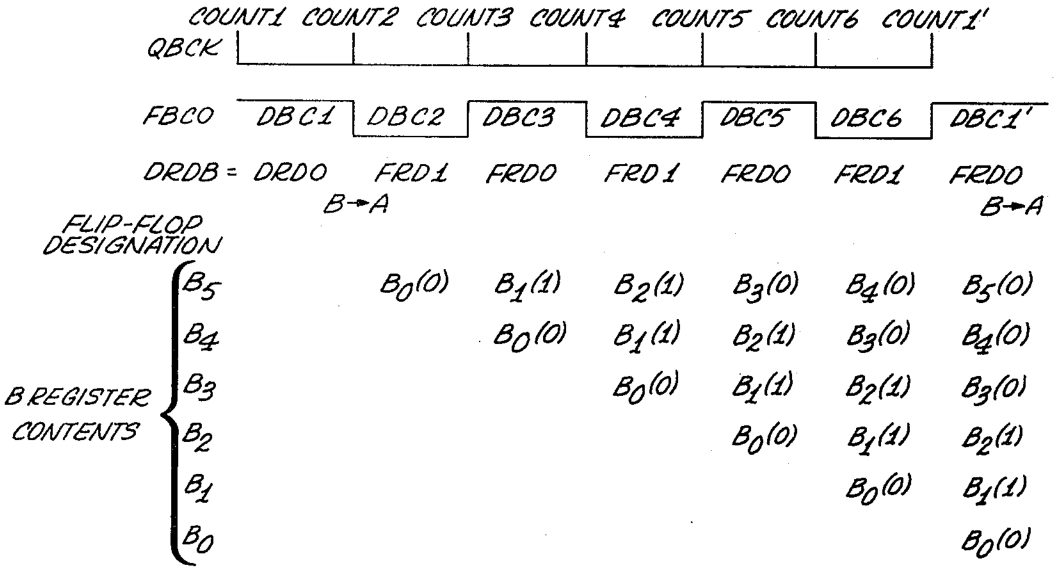

FIGURE 5 illustrates the contents of the B-Register as well as the flip-flops FBRP, FWD0 and FWD1 during this and each of the succeeding periods of time. Referencing that figure it is seen that at count 1 of the QBCK signal there occurs a parallel shift of the data in the A-Register to the B-Register to provide the contents therein. (In further explanation of FIG. 5, and additionally FIG. 6 which is to be utilized in the description of the reading operation, the left-hand column specifies that actual flip-flop involved while the several additional columns indicate the contents of the actual flip-flop with respect to the original contents of the B-Register or in the case of FIG. 6, the final contents of the B-Register. The 1's and 0's within the parentheses specify the binary value contained in accordance with the specific example being utilized for purposes of explanation. For example, referencing FIG. 5, at DBC3 time of FBCO the $B_1$ flip-flop will contain the original contents of the $B_3$ flip-flop, in the present example, a binary 0.)

Carrying through with the first six binary bits of the example initiated with respect to FIG. 2, that of writing a 10 01 00, it is seen (FIG. 5) that at this time the flip-flops $B_5$, $B_4$, $B_3$ and $B_0$ will contain binary 0's while flip-flops $B_2$ and $B_1$ will contain binary 1's. The state of the FBRP flip-flop is at this time immaterial while the FWD0 and FWD1 flip-flops contain respectively the original $B_4$ and $B_5$ designations of the character preceding the one now to be recorded. Upon the assumption that the FWD0 and FDW1 flip-flops 72 and 66 each contain binary 0's, the last binary digits of the preceding character, it is seen that during the occurrence of DCT1 a three input AND-gate 74 will be enabled, inasmuch as the 1 outputs of the two flip-flops 66 and 72 are 0's, to thus provide a signal to a two input OR-gate 76 the output of which is designated DD13. The DD13 signal forms one input to each of two 2 input OR-gates 78 and 94. The outputs of these two OR-gates form respectively an input to each of two AND-gates 80 and 96. AND-gates 80 and 96 each additionally include an input which is the QFUL signal and also the one and zero outputs, respectively, of a FWDC flip-flop 82. Thus it is seen that each time the DD13 signal is a binary 1 the FWDC flip-flop 82 will, upon the concurrence of the QFUL signal, be caused to change its state or to toggle.

The output of the FWDC flip-flop 82 is supplied to a two input AND-gate 84, the other input of which is the write signal from the sequencer and data supply unit 50. With the enabling of this gate a signal is provided which is supplied to an amplifier 86, the output of which is supplied to the transducer 24 to thereby write a flux transition on the data track 16 of the disc 10. This transition is written at the center of a data cell and represents the binary bit configuration 00.

Also at this same time, count 2 of the QBCK signal (FIG. 4), the AND-gate 62 was enabled to provide the QSBR signal which was supplied to the B-Register 64 to serially shift that register to the right such that the original content of $B_0$ is supplied to the FBRP flip-flop 70 and the original content of $B_1$ is now located in $B_0$. Similarly, each of the other portions of the B-Register has been shifted to the right by one, such that at this time the contents of the B-Register and the FBRP, FWD0 and FWD1 flip-flops are as is illustrated in the DBC2 column of FIG. 5. (The prime designation in this figure indicates the original contents of $B_5$ and $B_4$ of the word immediately preceding the word being written.)

Continuing with the example, at this time the FWD0 flip-flop 72 and the FWD1 flip-flop 76 contain binary 0's to designate the last two digits of the previous character while the $B_0$ portion of the B-Register and the FBRP flip-flop 70 contain a 10 combination, the first two digits of the new character. This, it will be remembered from the preceding description, is one of the combinations which in the present system requires the writing of a synchronization bit. Referencing again FIG. 3, it is seen that the 1 output terminal of $B_0$ forms one input of a two input AND-gate 84 the other input of which is the inversion of the 1 output of the FWD0 flip-flop 72. Inasmuch as $B_0$ and FWD0 contain a binary 1 and a binary 0 respectively, the output of the AND-gate 84 will be a binary 1. The output of AND-gate 84 is applied to an OR-gate 86 the output of which forms one input to a four input OR-gate 88. A second input to AND-gate 88 is the inversion of the 1 output terminal signal of FWD1 flip-flop 66 and, inasmuch as this flip-flop has been previously stated to contain a binary 0, this is effectively a binary 1 supplied to AND-gate 88. The third input to AND-gate 88 is from the 1 output terminal of the FBRP flip-flop 70 which, as has been stated, now contains the original contents of the $B_0$ portion of the B-Register 64 and is a binary 0. This input to AND-gate 88 when inverted as indicated appears as a binary 1. The fourth input to AND-gate 88 is the WCT3 signal. Thus, at the occurrence of this latter signal AND-gate 88 will be enabled to provide an output to OR-gate 76 which in turn provides the DD13 signal which, as was previously discussed, will upon the occurrence of the QFUL signal occurring at the end of the DCT3 time, toggle the FWDC flip-flop 82 to again write a flux reversal onto the data track of the disc 10. This reversal will occur at a boundary of a cell, as is illustrated in FIG. 4, and is a flux reversal to be utilized for synchronization purposes and not as data.

At the occurrence of the QBCK signal designated count 3 in FIG. 4, the QSBR signal is again generated to serially shift the B-register and to vary the contents of the FBRP, FWD0, and FWD1 registers 70, 72 and 66 respectively. With this transfer the content of the several flip-flops is as indicated in the DBC3 column of FIG. 5. More specifically, with respect to the pertinent registers for writing, it is seen that the FWD1 flip-flop contains the original content of the $B_1$ (a binary 1 in the present example) and the FWD0 flip-flop contains the original content of $B_0$ (binary 0). The FBRP flip-flop contains the original content of $B_1$ (a binary 1) and $B_0$ contains the original content of the $B_2$ portion of the B-Register (a binary 1). It is noted that the FWD0 and FWD1 flip-flops 72 and 66 now contain respectively a binary 0 and a binary 1, the first two bits of the new character to be written. This in the present example is a 10 bit configuration which will be written during DBC4 time at the occurrence of the DCT2 signal. This may be seen in FIG. 3 in that inasmuch as the FWD1 flip-flop 66 contains a binary 1 in its 1 output terminal is high and forms one input to a two input AND-gate 90, the other input of which is the DCT2 signal. The output of the AND-gate 90 is supplied as one input to an OR-gate 92 whose output is designated DD02. The DD02 signal forms one input to each of the two OR-gates 78 and 94 whose outputs effect, as has been previously explained, the changing of state or toggling of the FWDC flip-flop 82. With the toggling of the FWDC flip-flop 82 there is written via gate 84, amplifier 86 and transducer 24 a flux transition onto the data track 16, a transition corresponding to the end of DCT2, or, as is shown in FIG. 4, at ¾ point within cell 2.

At that QBCK signal designated as count 4 (FIG. 4), the B-Register is again serially shifted and the content of $B_0$ as it existed prior to the shift is transferred to FBRP (QSBR is also present) and the content of $B_1$ as it existed prior to the shift is transferred to $B_0$. However, inasmuch as at this time the FBCO signal is at a high level, AND-gate 68 is not enabled and the contents of FWD1 flip-flop 66 and FWD0 flip-flop 72 are not changed. The contents of the several flip-flops as they exist at this time are illustrated in that column of FIG. 5 listed under the DBC4 time. With respect to the binary configuration of the present example, FWD1 contains a binary 1, FWD0 a binary 0, FBRP a binary 1, and $B_0$ a binary 0.

With the occurrence of that QBCK signal designated count 5, the QSBR signal is again generated to serially shift the B-Register 64 and, because the FBCO signal is now a low level signal, the output of AND-gate 68 is a binary 1, as is the QSBR signal, to thereby allow the modification of the FBRP, FWD0 and FWD1 flip-flops. The B-Register and the latter three flip-flops now contain that illustrated in FIG. 5, column DBC5. Insofar as their binary content is concerned, it is seen that $B_1$, $B_0$, FBRP and FWD1 all contain binary 0's and FWD0 contains a binary 1. The FWD0 and FWD1 flip-flops 72 and 66 respectively now contain the next two bit configuration 01 which is to be written. Inasmuch as the 1 output of the FWD0 flip-flop 72 is a high level and AND-gate 95 will be enabled with the occurrence of the DCT0 signal. The output of AND-gate 95 is supplied to the OR-gate 92 to form the DD02 signal which is effective to toggle, at the QFUL pulse occurring at the end of the DCT0 pulse during DBC5 time, the FWDC flip-flop 82. As before the changing of state of the flip-flop 82 causes a flux transition to be recorded onto the data track 16. Thus, the second two bits of the six bit character which is desired to be written has been accomplished.

With the occurrence now of the QBCK pulse designated count 6, the QSBR signal will again be generated to serially shift the B-Register but once again because of the level of the FBCO signal, the contents of the FWD0 and FWD1 flip-flops 72 and 66 are not changed.

Referencing FIG. 5, column DBC6, it is seen that a 01 combination exists in the FWD1 and FWD0 flip-flops and a 00 combination is present in the $B_0$ and FBRP flip-flops. This is a second of the specified combinations which require the writing of a synchronization flux reversal. A binary 1 is now being maintained in the FDW0 flip-flop 72 and a binary 0 is being maintained in the FWD1 flip-flop 66. Binary 0's are being maintained in $B_0$ and the FBRP flip-flop 70. This situation will, with the occurrence of the DCT3 signal, enable AND-gate 88 to thus enable OR-gate 76 the output of which is the DD13 signal. At the occurrence of the QFUL signal at the end of the DCT3 signal the FWDC flip-flop 82 will again change state to thus write a synchronization flux reversal at the cell boundary on the data track 16.

At the same time this synchronization flux reversal is written, the second count 1 shown in FIG. 4, the last two bit binary configuration (00) of the character being written, is parallel shifted at the occurrence of the QBCK signal into the FWD0 flip-flop 72 and the FWD1 flip-flop 66. The present contents of flip-flops are shown in FIG. 5 under that column designated DBC1'. Once again, as was previously explained, with binary 0's in FWD0 and FWD1 flip-flops, AND-gate 74 is enabled with the occurrence of the DCT1 signal to generate the DD13 signal and toggle the FWDC flip-flop 82 with the occurrence of that QFUL signal appearing at the end of DCT2 time.

Also at the second count 1, a new six bit character which was brought in via bus 52 to the sequence and data supply unit 50 and placed into the A-Register 56 at a time prior thereto, is parallel shifted from the A-Register 56 to the B-Register 64 in the manner previously described.

The only bit configuration which is possible with two binary bits and which was not considered in our previous example is the 11 combination. Very briefly, it is seen that if this combination exists in the FWD0 and FWD1 flip-flops, AND-gate 95 will be enabled to provide a DD02 signal to toggle the FWDC flip-flop 82 when the QFUI signal occurs at the end of DCT0 time. AND-gate 90 will be enabled to provide the DD02 signal from OR-gate 92 to toggle the FWDC flip-flop 82 when the QFUL signal occurs at the end of DCT2 time. Thus, two flux reversals, one at the ¼ and one at the ¾ points of the cell period will be written for an 11. While only two of the three examples of providing the synchronization flux reversal for various bit combinations of characters have been explained, it is readily ascertainable from FIG. 3 a 01 bit configuration followed by a 10 bit configuration will result in the writing of a synchronization reversal.

While the foregoing description of the write operation has been explained with respect to timing initially derived from a timing track on the storage medium, in this case a disc, it is to be expressly understood that this is an expediency inasmuch as such a track is normally available on a data recording disc. It is not, however, a requirement, of the present invention. If desired, the output of a precision oscillator could be utilized to initiate the generation of the several timing pulses and timing marks.

READ OPERATION

The timing signals in the read operation of the present invention are generated in the manner previously described with the exception that, inasmuch as this is a self-clocking system, the signals which initiate the various timing signals are derived from the data track itself through amplifier 26. The use of data signals as opposed to the timing track as was previously described is a function of the OR-gate 22 as was heretofore explained. It should also be explained, before proceeding with the read operation, that because of the logic used in the present illustration the data cell divisions do not fall exactly as is indicated in FIG. 4 which are those for the write operation. Instead, with respect to the DCT times, the data cell divisions are displaced to the left by one time. That is, a 00 bit combination occurs during DCT0 and a 10 bit combination is read during DCT1. Similarly, a synchronization reversal occurs during DCT2 time and a 01 bit combination is read during DCT3 time.

With the initiation of a read operation, a read command is brought in via bus 52 to the sequencer and data supply unit 50 which, in response thereto, generates two signals, the FSBR signal and a read signal. These two signals form the two inputs to an AND-gate 100 the output of which forms one input of the OR-gate 60. As before, the output of OR-gate 60 allows AND-gate 62 to be enabled with each occurrence of the QBCK signal to generate the QSBR signal. The read and QBCK signals also form two inputs of a three input AND-gate 102 the output of which is designated QXBA. This signal effects the parallel transfer of the B-Register to the A-Register via lines 55. The third input to the AND-gate 102 is from the 1 output terminal of a BFUL flip-flop 104. The BFUL flip-flop 104 is placed into its set state by the QBCK signal at the end of the signal, bit count=6, from the bit counter 38. The bit count=6 signal corresponds to the DBC6 period of the FBCO signal (FIG. 4). Flip-flop 104 is placed into a reset state by the QBCK signal at the end of the bit count=1 signal from the bit counter 38. The bit count=1 signal corresponds to the DBC1 time of the FBCO signal of FIG. 4. Inasmuch as the BFUL flip-flop 104 is a trigger flip-flop having the QBCK signal applied to its trigger terminal, it can only change its state with the concurrence of one of the two above specified signals and the QBCK signal.

Electrical signals indicative of the data recorded on the data track 16 of the disc 10 are supplied from the pulse shaper 28 through a suitable delay means 106 to form one input to each of two AND-gates 108 and 110. These signals are also delivered to the sequencer and data supply unit 50 for purposes of synchronizing that unit. Data from the output of the delay means 106 is designated QONE and will appear as a positive going pulse with each flux reversal which was recorded on the data track 16. The second input to the AND-gate 108 is the DCT3 signal such that upon the concurrence of the DCT3 signal and a pulse on QONE, AND-gate 108 is enabled to place an FRD0 flip-flop 112 into its set state. The FRD0 flip-flop is placed into its reset state by the logical conjunctive combination of the signals DCT1 and QBCK. The second input to the AND-gate 110 is the signal DCT1. Upon the concurrence of this signal with a positive pulse QONE, AND-gate 110 will be enabled to place into its set state an FRD1 flip-flop 114. The FRD1 flip-flop 114 is placed into its reset state by the application to its reset terminal of the conjunctive combination of the DCT3 signal with the QBCK signal.

The 1 output terminal of the FRD0 flip-flop 112 is connected to one input of an AND-gate 116 whose output forms one input of an OR-gate 118 the output of which is a signal DRDB. The second input to AND-gate 116 is the signal FBCO such that the output of AND-gate 116 is at a high level when the FRD0 flip-flop 112 is in its set state and the FBCO signal is a high level. The 1 output terminal of the FRD1 flip-flop 114 forms one input to a two input AND-gate 120, the other input of which is the inversion of the FBCO signal such that the output of AND-gate 120 is a binary 1 when the FRD1 flip-flop is set and the FBCO signal is at a low level. The output of AND-gate 120 forms the second input to OR-gate 118 which, as was previously stated, is the DRDB signal. The DRDB signal is applied to the set terminal of the $B_5$ flip-flop of the B-Register and its inversion is connected to the reset terminal of that same flip-flop. Thus, when DRDB is a high level signal, and with the occurrence of the QSBR signal, the $B_5$ flip-flop of the B-Register will be set or will contain a binary 1. Conversely, when the DRDB signal is at a low level and the QSBR pulse occurs, the $B_5$ flip-flop of the B-Register will be placed into its reset state, i.e., containing a binary 0.

The read operation is substantially as follows and will be explained with respect to the character previously recorded which was a 10 01 00 binary configuration. Referencing once again FIGS. 3 and 4, at the occurrence of the QBCK signal designated count 1, the BFUL flip-flop 104 is set (the bit count=6 signal being a binary 1 at that time). Also at the count 1 signal, the last bit of the previous character was shifted into $B_5$ of the B-Register from the DRDB line with the occurrence of QSBR. This, as will be remembered, was a binary 0 and therefore the signal DRDB was a low level signal.

The first positive pulse on QONE occurs, as may be seen in FIG. 4, during DCT1 time. The combination of these two signals enables AND-gate 110 to place the FRD1 flip-flop 114 into its set state. During this time neither of the AND-gates 116 nor 120 is enabled such that the DRDB signal is at a low level. With the appearance of the count 2 QBCK signal, several events occur. Because the BFUL flip-flop 104 is in the set state at this time, the QXBA signal is generated to transfer the contents of the B-Register 64 to the A-Register 56. The BFUL flip-flop is not reset. Also with the occurrence of the count 2 signal, the QSBR signal is generated and the binary 0 of the DRDB signal is stored into $B_5$ of the B-Register 64. During the DBC2 when the signal FBCO becomes a binary 0 and with FRD1 still set, AND-gate 120 is enabled thus causing the DRDB signal to become a binary 1.

The next QONE pulse occurs during DCT3 time thus enabling AND-gate 108 and placing the FRD0 flip-flop 112 into its set state. At this time, however, AND-gate 116 is disabled because of the low value of the FBCO signal. At the count 3 QBCK signal, the B-Register is serially shifted transferring the contents of $B_5$ into $B_4$. Because the FBCO signal is now a binary 1. AND-gate 116 is enabled resulting in a high level DRDB signal at the set terminal of the $B_5$ flip-flop to place a binary 1 in position 5 of the B-Register 64. The B-Register contents are now as shown in the DBC3 column of FIG. 6. Referencing that figure, it is seen that $B_5$ contains a binary 1 and $B_4$ contains a binary 0. (These, respectively, will be the final $B_1$ and $B_0$ bits of the B-Register when the full character has been shifted in.) Also with the occurrence of the count 3 QBCK signal which occurs at the end of DCT3 time, the FRD1 flip-flop 114 is reset.

During DBC3 time the FRD0 flip-flop 112 is set and the signal FBCO is at a high level. Thus, DRDB is a high level signal. At the count 4 QBCK signal, the B-Register is againn shifting and the high level signal which is present on the DRDB is recorded or placed as a binary 1 into $B_5$ of the B-Register 64. The contents of the B-Register are now as shown in the DBC4 column of FIG. 6. Also with the occurrence of the count 4 QBCK and the DCT1 signals the FRD0 flip-flop 112 is reset. The next pulse occurring on QONE is during DCT2 time of DBC4 time. This pulse can set neither the FRD0 nor the FRD1 flip-flops and it is, therefore, ineffective as a data transfer. It will be remembered that this was the transition which was recorded solely for purposes of synchronization maintenance and not at data.

At the occurrence of the count 5 QBCK signal, neither of the flip-flops 112 nor 114 is set and the DRDB signal is at a low level. Therefore, with the generation of the QSBR pulse the contents of the B-Register are shifted to the right and the low level DRDB signal places the $B_5$ flip-flop of the B-Register into its reset state. At this point in time the B-Register contains what will be ultimately bits 0 to 3 in the $B_2$ to $B_5$ flip-flops of the B-Register 64 (see column DBC5 of FIG. 6).

The next QONE pulse occurs in the period of the DCT0 signal during DBC5 time. Inasmuch as a pulse occurring during DCT0 time cannot set either of the flip-flops 112 or 114, the line DRDB is at a low level such that with the occurrence of the count 6 QBCK pulse the B-Register 64 is shifted to the right and the low level signal on DRDB (a binary 0) is placed into the $B_5$ flip-flop of the B-Register 64. Again referencing FIG. 6, the present status of the B-Register is indicated in the DBC6 column.

With the occurrence of the second count 1 QBCK pulse, and with the presence of the bit count=6 signal applied to the set terminal of the BFUL flip-flop 104, that flip-flop is placed into its set state. Also with the occurrence of the count 1 pulse the B-Register is again shifted to the right and the DRDB line being at a low level places a binary 0 into the $B_5$ flip-flop. The B-Register now contains a full six bit character and its contents are as indicated in the DBC1′ column of FIG. 6. By the comparison of this to the DBC1 column of FIG. 5, it is seen that this is the identical character that was written onto the storage medium during the description of the write cycle.

At the time of the next count 2 pulse of QBCK the QXBA signal is again generated and the contents of the B-Register are transferred in parallel to the A-Register and hence to the sequence and data supply unit 50 for subsequent utilization. Also at this time the first bit of the next character would be shifted into the B-Register as was previously explained.

From the foregoing explanation of the read operation it is seen that only those pulses which occur during the times DCT1 and DCT3 are effective to set either the FRD0 flip-flop 112 or the FRD1 flip-flop 114. From this the conclusion can be drawn that those flux reversals which were written onto the data track for purposes of synchronization and those which represent the 00 bit configuration are actually superfluous to the read operation except insofar as they are necessary to maintain synchronization of the timing system.

From the foregoing it is seen that there has been shown and described a means and method for recording binary data in a manner which allows a greater amount of data to be recorded with a relative few number of pulses. It should be explained that while the transition and 00 pulses are not necessary to the reading operation, they are not harmful in decreasing the time between flux reversals in that their occurrence does not reduce the minimum spacing between reversals in recording without these pulses.

While the principles of the invention have now been made clear in an illustrative embodiment, there will be immediately obvious to those skilled in the art many modifications of the structure, arrangement, proportions, the elements, materials, and components, used in the practice of the invention, and otherwise, which are particularly adapted for a specific environment and operating requirements without departing from these principles. The appended claims are therefore intended to cover and embrace any such modifications, within the limits only of the true spirit and scope of the invention.

What is claimed is:

1. An information storage and retrieval system comprising a magnetic storage medium capable of assuming and maintaining magnetically polarized regions within localized areas of said medium; transducer means responsive to a waveform of electrical signals for recording a series of polarization changes on said medium within sequentially occuring time intervals; means for associating a two binary bit configuration with each of said time intervals; and means for generating said waveform including first means for producing a first electrical signal at a first point in time within one of said time intervals in response to a first two binary bit configuration, second means for producing a second electrical signal at a second point in time within one of said time intervals in response to a second two binary bit configuration, said first and second means producing said first and said second signals at said first and second points in time within one of said time intervals in response to a third two binary bit configuration and third means for producing a third electrical signal at a third point in time within one of said time intervals in response to a fourth two binary bit configuration.

2. An information storage and retrieval system comprising a magnetic storage medium capable of assuming and maintaining magnetically polarized regions within localized areas of said medium; transducer means responsive to a waveform of electrical signals for recording a series of polarization changes on said medium within sequentially occurring time intervals; means for associating a two binary bit configuration with each of said time intervals; and means for generating said wave form including first means for producing a first electrical signal at a first point in time within one of said time intervals in response to a binary bit configuration of 01, second means for producing a second electrical signal at a second point in time within one of said time intervals in response to a binary bit configuration of 10, said first and second means producing said first and said second signals at said first and second points in time with one of said time intervals in response to a binary bit configuration of 11, and third means for producing a third electrical signal at a third point in time within one of said time intervals in response to a binary bit configuration of 00.

3. An information storage and retrieval system in accordance with claim 2 which further includes additional means responsive to two successive two binary bit configurations for producing a fourth electrical signal at a fourth point in time within one of said time intervals in response to predetermined combinations of two successive two binary bit configurations.

References Cited

UNITED STATES PATENTS 3,374,475 3/1968 Gabor ------------ 340—174.1

BERNARD KONICK, Primary Examiner

W. F. WHITE, Assistant Examiner

U.S. Cl. X.R.

346—74